(12) United States Patent
Ota

(10) Patent No.: US 7,117,285 B2
(45) Date of Patent: Oct. 3, 2006

(54) METHOD AND SYSTEM FOR EFFICIENTLY DIRECTING INTERRUPTS

(75) Inventor: Eiji Ota, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 320 days.

(21) Appl. No.: 10/651,888

(22) Filed: Aug. 29, 2003

(65) Prior Publication Data

US 2005/0060462 A1 Mar. 17, 2005

(51) Int. Cl.
*G06F 13/26* (2006.01)
*G06F 15/00* (2006.01)

(52) U.S. Cl. .................. 710/265; 711/118; 719/319
(58) Field of Classification Search ............ 710/49, 710/260, 262, 266; 709/102, 105; 712/16; 703/25
See application file for complete search history.

(56) References Cited

U.S. PATENT DOCUMENTS

| | | | | |
|---|---|---|---|---|
| 4,779,195 A | * | 10/1988 | James ..................... | 710/49 |
| 4,959,781 A | * | 9/1990 | Rubinstein et al. ........ | 710/262 |
| 5,265,215 A | * | 11/1993 | Fukuda et al. ............ | 710/123 |
| 5,428,799 A | * | 6/1995 | Woods et al. ............. | 710/266 |
| 5,555,430 A | * | 9/1996 | Gephardt et al. .......... | 712/16 |
| 5,619,705 A | * | 4/1997 | Karnik et al. ............. | 710/266 |
| 5,857,090 A | * | 1/1999 | Davis et al. .............. | 703/25 |
| 5,918,057 A | * | 6/1999 | Chou et al. ............... | 710/260 |
| 6,148,361 A | * | 11/2000 | Carpenter et al. .......... | 710/260 |
| 6,189,065 B1 | * | 2/2001 | Arndt et al. .............. | 710/260 |
| 6,192,442 B1 | * | 2/2001 | Haren et al. .............. | 710/269 |
| 6,219,741 B1 | * | 4/2001 | Pawlowski et al. ......... | 710/260 |
| 6,813,665 B1 | * | 11/2004 | Rankin et al. ............. | 710/260 |
| 6,952,749 B1 | * | 10/2005 | Kim ........................ | 710/260 |
| 2003/0105798 A1 | * | 6/2003 | Kim et al. ................ | 709/105 |
| 2003/0120702 A1 | * | 6/2003 | Jahnke ..................... | 709/102 |
| 2005/0060460 A1 | * | 3/2005 | Karamatas et al. ......... | 710/260 |

\* cited by examiner

*Primary Examiner*—Christopher E. Lee
(74) *Attorney, Agent, or Firm*—Martine Penilla & Gencarella, LLP

(57) ABSTRACT

A method and system for efficiently directing interrupts is disclosed. In a computer system having multiple processors, a computer implemented method, upon detecting an interrupt directed to one of the processors, determines a policy for efficiently handling the interrupt. Upon invoking the policy, the interrupt is redirected according thereto to a second processor for handling. The policies include an I/O affinity policy, a local memory policy, and a reduced I/O intension policy. In a multiple processor environment, a computer based system efficiently handles an interrupt directed to one of the processors. The system includes an interrupt dispatching module for redirecting the interrupt from that processor to another processor, where the interrupt is handled. The system also includes an interrupt redirection policy module associated with the interrupt dispatching module. The policy module provides a policy for controlling interrupt redirection, which promotes efficient operation.

27 Claims, 11 Drawing Sheets

METHOD AND SYSTEM FOR EFFICIENTLY DIRECTING INTERRUPTS

BACKGROUND

During operation of a computer system, a processor such as a central processing unit (CPU) is prompted and notified when an input/output (I/O) function is needed. This prompting is typically known as an interrupt. Upon prompting by an interrupt, control is transferred to an operating system (OS), which determines an action to be taken and prioritizes the action, along with other functions.

Modern computer systems may use a conventional fixed mode to deliver interrupts. In the fixed mode, interrupts from a device are delivered to one fixed, interrupt handling CPU. However, corresponding requests to the device may proceed from another CPU or from several other CPUs. Although this is a simple way to handle interrupts, it can be somewhat inefficient as applied to some modern computer systems.

For instance, on some computers, such as those characterized by the UltraSPARC architecture, the interrupt-handling CPU is fixed in booting. Upon fixing this CPU to handle interrupts, the computer system is constrained to handle interrupts on that CPU. Constraining the computer system to using the one fixed CPU to handle interrupts can impede system performance, because another processor may be able to handle a particular interrupt more efficiently than the fixed interrupt handling processor.

The conventional fixed mode of interrupt delivery can also be inefficient because the interrupt-handling CPU, CPU-X can become saturated when many interrupts occur in too short of a time period for CPU-X to process them completely and correctly. Further, access to memory and to cache may tend to be biased in computer systems that employ the fixed mode of interrupt delivery, which can cause further delay and also hinder efficiency.

This inefficiency can affect advanced systems. Besides the NUMA system discussed above, some of the advanced systems whose performance and efficiency can be affected include some I/O intensive systems and some advanced I/O adapters. Such advanced I/O adapters can include the Fire PCI-Express adapter and the fibre-channel card, among others.

SUMMARY OF THE INVENTION

A method and system for efficiently directing interrupts are disclosed. The method and system for more efficiently handling interrupts do not grossly impede performance. Further, the method and system for more efficiently handling interrupts more fully utilize the available resources of a computer system and is thus less wasteful and expensive of these resources.

In a computer system having multiple processors, one embodiment of the present invention provides a computer implemented method for handling an interrupt. Upon detecting an interrupt directed to one of the multiple processors, the method determines a policy for handling the interrupt in such a way as to promote efficient operation of the computer system. Upon invoking the policy, the interrupt is redirected to a second of the multiple processors according to the policy. The interrupt is then handled at the second processor. The policies include, but are not limited to, an I/O affinity policy, a local memory policy, and a reduced I/O intension policy.

The I/O affinity policy effectively takes advantage of the redirection target processor being associated with a warm cache. Data relevant to handling the interrupt is predicted to already be available at the redirection target processor, which reduces latency and thus improves efficiency. The local memory policy effectively takes advantage of the redirection target processor being proximate to information relevant to handling the interrupt, such as driver code. Redirecting the interrupt to the processor proximate to the code reduces latency and thus improves efficiency.

The reduced I/O intension policy provides interrupt handling load sharing capability for a processor that receives multiple interrupts in close temporal proximity (e.g., effectively simultaneously) where the other processors are idle with respect to interrupts. Redirecting one of the interrupts from the interrupt-inundated processor to one of the idle processors spreads the interrupt-handling load among the processors more evenly, improves the interrupt-handling response of the inundated processor, and thus improves efficiency.

Further, in a multiple processor computer environment, a computer based system, which can be deployed in the kernel of the OS, efficiently handles an interrupt directed one of the processors. In one embodiment, the system includes an interrupt dispatching module, for redirecting the interrupt from that processor to another of the multiple processors, where the interrupt is handled. The system also includes an interrupt redirection policy module associated with the interrupt dispatching module. This policy module provides a policy to enact the interrupt redirection, which promotes efficient operation in the computer environment. Mechanisms are provided for implementing the policies.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1A:
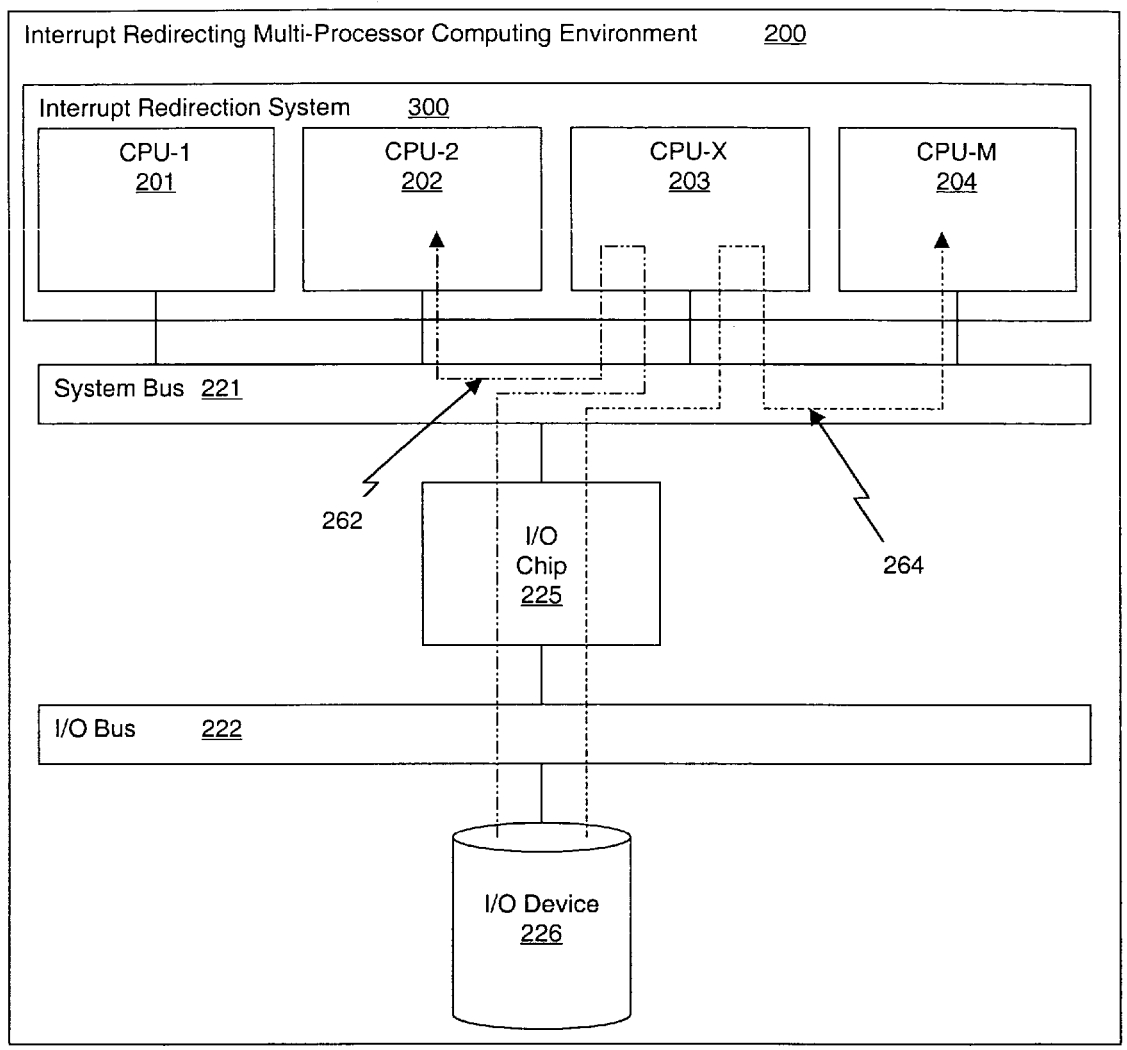
FIG. 1A depicts an exemplary interrupt redirecting multiprocessor computing environment, according to one embodiment of the present invention.

A method and system for efficiently directing interrupts are disclosed. Reference will now be made in detail to several embodiments of the invention, examples of which are illustrated in the accompanying drawing figures. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, one of ordinary skill in the art will realize that embodiments of the present invention may be practiced without these specific details. In other instances, well-known methods, processes, algorithms, procedures, systems, components, and circuits have not been described in detail so as not to unnecessarily obscure aspects of the present invention.

A computer system that embodies a system and performs a method for efficiently directing interrupts can comprise any kind of multi-processor computer system with sufficient computing power and memory capacity. For example, the computer system can comprise a network computer, a distributed computing system, a workstation computer system, a personal computer system, a specialized business and financial computing system, a main-frame computer system, or a supercomputer system. Modules of the system for efficiently directing interrupts can be implemented in software, firmware, and/or hardware or any combination of software, firmware, and/or hardware.

Portions of the detailed descriptions of embodiments of the invention that follow are presented and discussed in terms of processes. Although specific steps and sequence thereof are disclosed in figures herein (e.g., FIGS. 2B, 4B, 5B, 6B, 7B) describing the operations of these processes (e.g., processes 20, 400, 50, 60, 70, respectively), such steps and sequence are exemplary. Embodiments of the present invention are well suited to performing various other steps or variations of the steps recited in the flowcharts of the figures herein, and in another sequence than the sequence depicted and described.

In one embodiment, such processes are carried out by processors and electrical/electronic components under the control of computer readable and computer executable instructions. The computer readable and computer executable instructions reside, for example, in data storage features, memory, cache registers and other components of the computer system deploying the system for efficiently directing interrupts. However, the computer readable and computer executable instructions may reside in any type of computer readable medium.

Embodiments of the present invention provide a method and system for efficiently directing interrupts. The method and system of embodiments of the present invention achieve resource efficiency for a computer system having multiple processors by redirecting an interrupt to a processor that can more efficiently handle the interrupt. Upon detecting that the interrupt is directed to one of the multiple processors, the method determines a policy for handling the interrupt in such a way as to promote efficient operation of the computer system. Upon invoking the policy, the interrupt is redirected to a second of the multiple processors according to the policy. The interrupt is then handled at the second processor. The policies include, but are not limited to, an I/O affinity policy, a local memory policy, and a reduced I/O intension policy.

The I/O affinity policy redirects interrupts to a particular processor on the basis of that processor possessing cached data. The presence of this cached data can imply that the target processor for redirection on the basis of the I/O affinity policy can probably proceed upon receiving the redirected interrupt with the operation requested by that interrupt without having to fetch and cache data from a location external to the processor cache, thus reducing memory latency and concomitantly improving efficiency. The I/O affinity policy is referred to herein as a "warm cache policy."

The local Memory Policy redirects interrupts to a processor on the basis of that processors location, low latency, or other proximity to a particular memory location. For instance, where the operation requested by an interrupt requires access to driver code stored in a memory area closest to one of several processors, the local memory policy selects that closest processor as the target for the redirection of that interrupt. Redirection on the basis of memory locale can provide efficient operation in non-uniform memory access (NUMA) architectures. The local memory policy is referred to herein as a "NUMA locality policy."

A condition can arise in a multi-processor system where one particular processor is subjected to multiple and/or repeated interrupt requests within a short time interval, while the other processors are subjected to relatively few (or no) interrupts. This condition can saturate the processor that receives the many interrupt requests, which can cause delays in its response thereto and/or cause it to fail to respond to one or more of the interrupts. The I/O intension reduction policy redirects some of the incoming interrupts from the affected processor to one or more of the unaffected processors, thus reducing the interrupt response load on the affected processor. The I/O intension reduction policy is referred to herein as a "load sharing policy."

Further, in such a multiple processor computer environment, a computer based system, which can be deployed in an OS kernel of the computer environment, efficiently handles an interrupt directed one of the processors. In one embodiment, the system includes an interrupt dispatching module, for redirecting the interrupt from that processor to another of the multiple processors, where the interrupt is handled. The system also includes an interrupt redirection policy module associated with the interrupt dispatching module. This policy module provides a policy to direct the interrupt redirection, which promotes efficient operation in the computer environment.

Exemplary Interrupt Redirecting Multi-Processor Computing Environment

FIG. 1A depicts an exemplary interrupt redirecting multi-processor computing environment 200, according to one embodiment of the present invention. Interrupt redirecting multi-processor computing environment 200 comprises a plurality of M processors, comprising CPU-1 201, CPU-2 202, CPU-X 203, and CPU-M 204, which are interconnected by system bus 221.

Figure 4A:
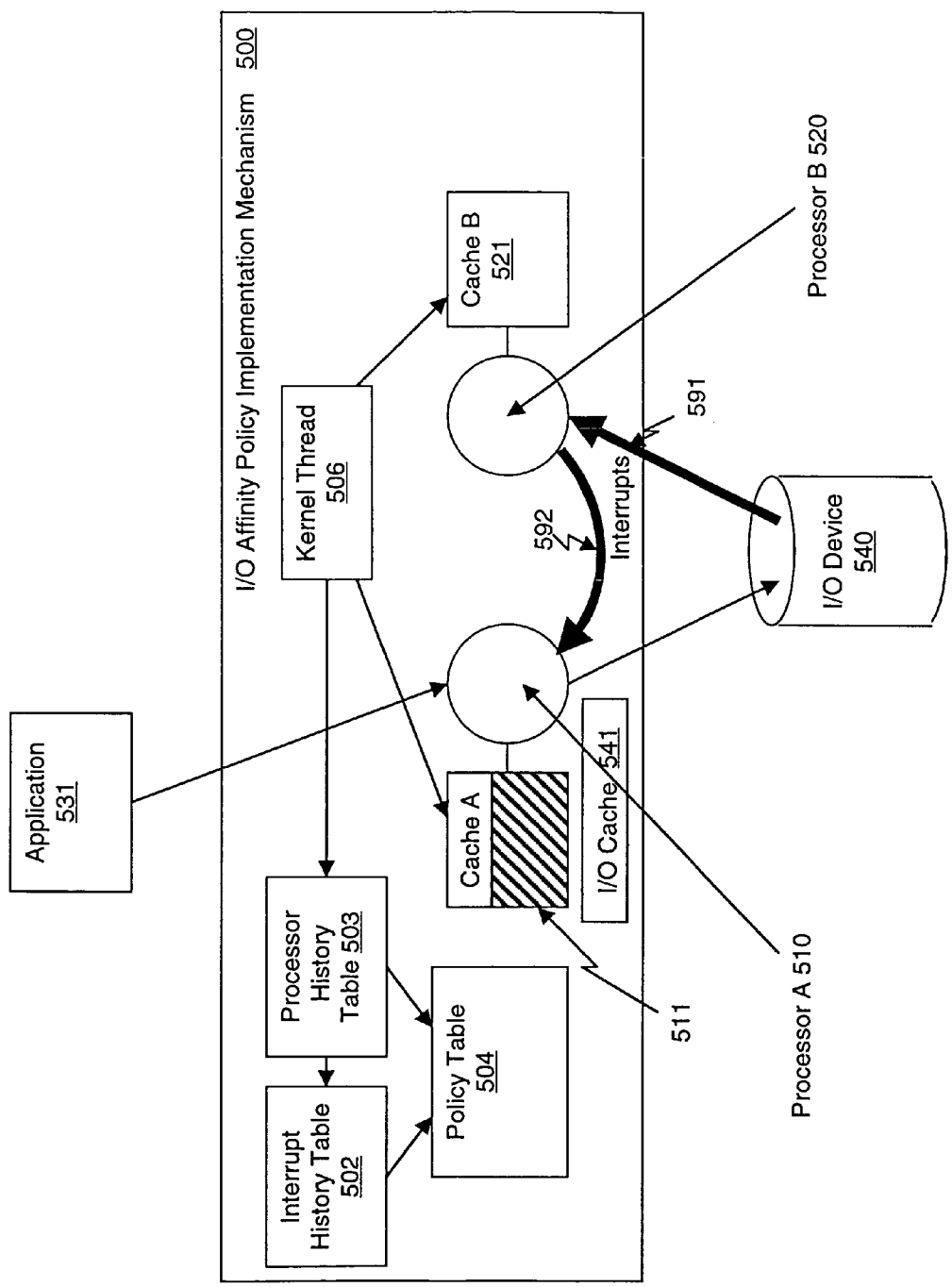
FIG. 4A depicts an exemplary system for implementing an interrupt redirection based upon a warm cache policy, according to one embodiment of the present invention.
Figure 5A:
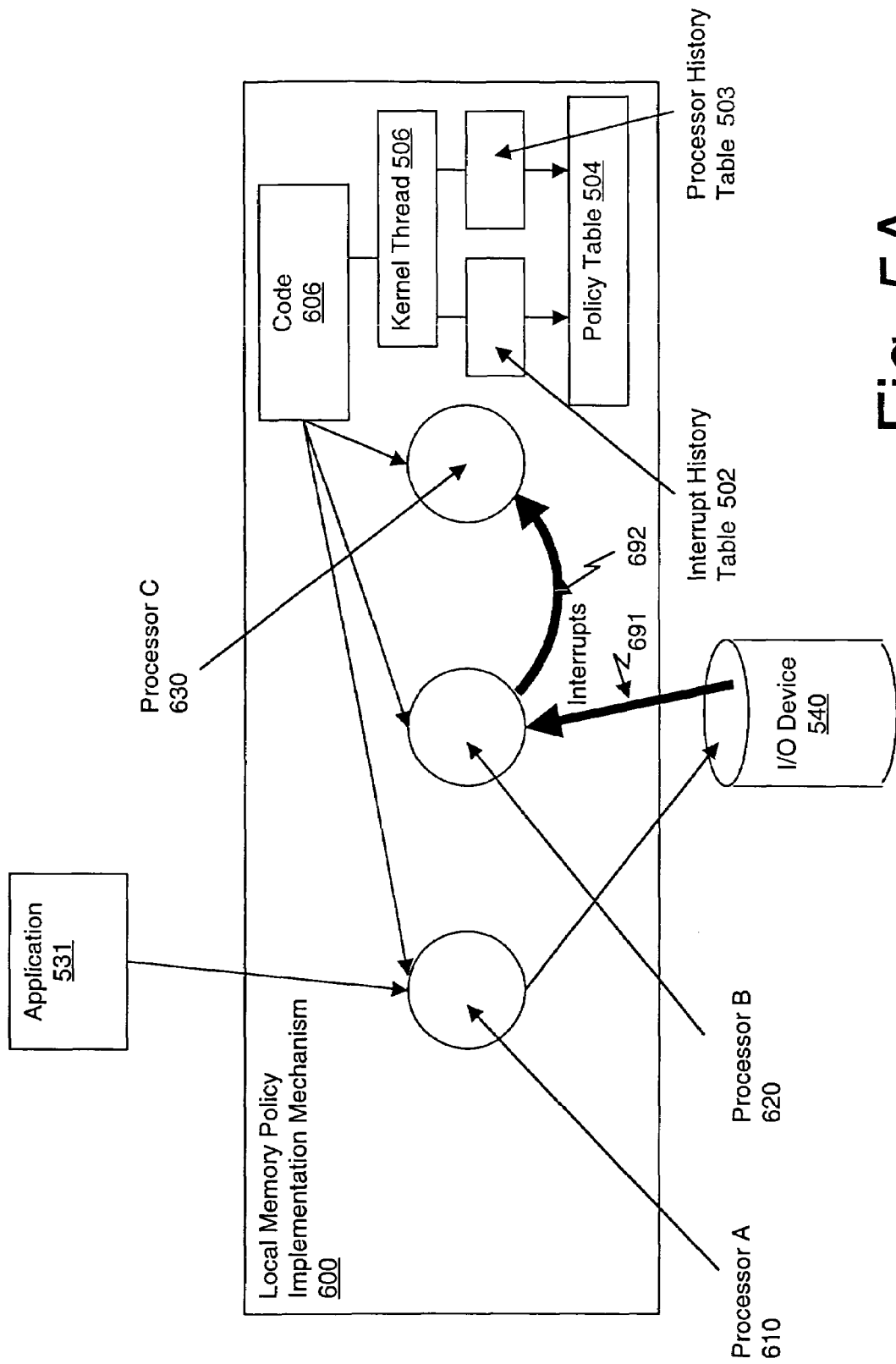
FIG. 5A depicts an exemplary system for implementing an interrupt redirection based upon a local memory policy, according to one embodiment of the present invention.

Input/output (I/O) chip 225 can be connected to any of the M processors via system bus 221. An I/O device 226, such as a disk or flash drive or another I/O device (examples include printers, monitors, keyboards, etc.), is connected to I/O chip 225 via I/O bus 222. Interrupt request (IRQ) 262 and IRQ 264 are generated when an input to I/O device 226 or an output therefrom is required, such as by programs such as an application (e.g., application 531; FIGS. 4A, 5A) running on processors 201–204, or a user.

In one embodiment of the present invention, the interrupt redirection system 300, which can comprise software information combined with the hardware functionality of CPU-X 203 (and the other processors), that redirects the interrupts 262 and 264 to other processors, which can improve efficiency, such as by taking advantage of a warm cache, reducing memory latency, and/or by sharing of the interrupt handling load. Interrupt redirection system 300 is depicted as encompassing CPU-1 201, CPU-2 202, CPU-X 203, and CPU-M 204 to illustrate its function in the redirection of interrupt requests 262 and 264 from CPU-X 203 among the other processors.

Figure 2:
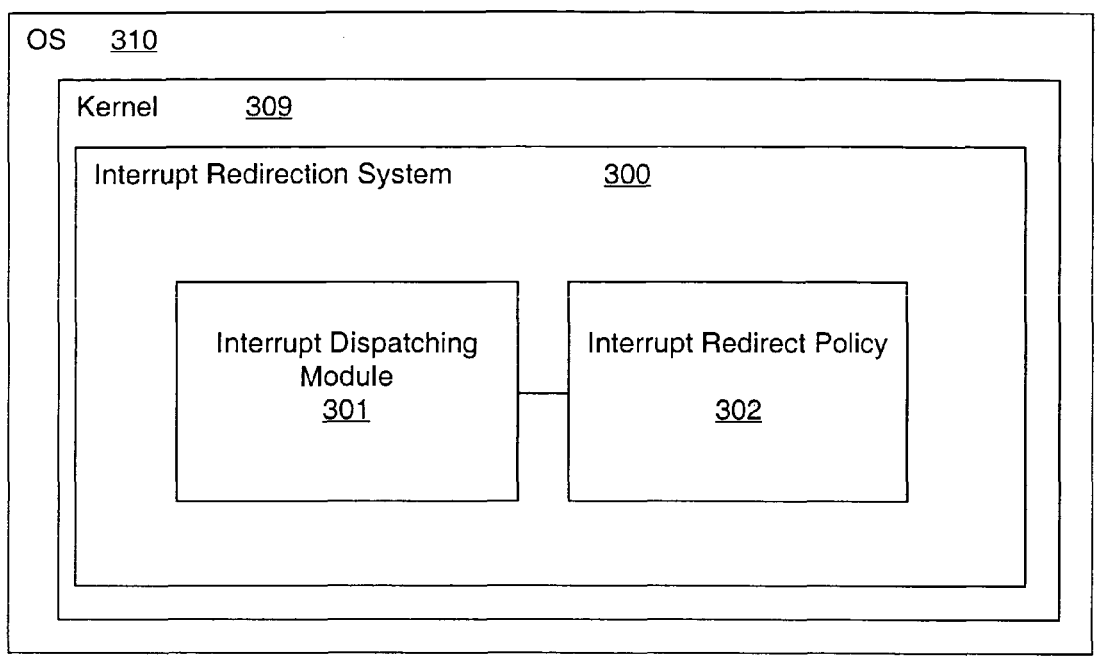
FIG. 2 depicts an exemplary computer based interrupt redirection system, according to one embodiment of the present invention.

In one embodiment, the software information comprises a functionality of the kernel of an operating system (e.g., kernel 309, OS 310; FIG. 2). The hardware functionality, in one embodiment, is provided by the processors themselves, and associated components, such as system bus 221, upon which the redirected interrupts are transmitted between the processors. In one embodiment, a processor notifies the operating system after receiving an interrupt from an external device, and correspondingly changes a program counter (or e.g., an instruction pointer) to run an operating system defined interrupt handler to deal with the event, by processes known in the art. In another embodiment, the operating system acts to suppress the response of CPU-X 203, to interrupts 262 and 264, except for redirecting them to CPU-2 202 and CPU-M 204, respectively, according to a redirection policy.

Interrupt redirection system 300 comprises, in one embodiment, an interrupt dispatcher and a redirection policy (e.g., interrupt dispatching module 301, interrupt redirection policy 302; FIG. 2). The redirection of interrupts 262 and 264 are performed in one embodiment by the dispatcher (e.g., dispatcher 301; FIG. 2) on the basis of the policy. Interrupt 262 is redirected to CPU-2 202 and interrupt 264 to CPU-M 204. interrupt redirection system 300 thus combines software information with hardware functionality, such as from processor CPU-X 203.

Figure 3A:
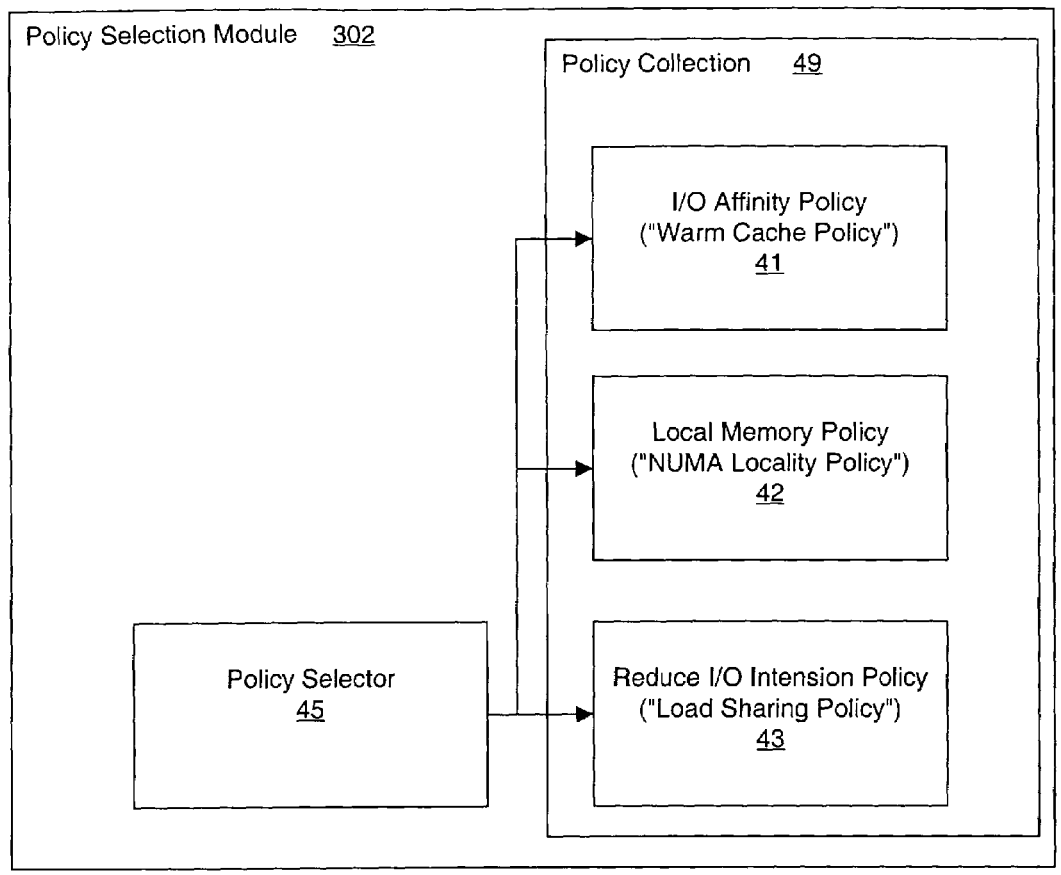
FIG. 3A depicts an exemplary interrupt redirection policy module, according to one embodiment of the present invention.

The policies upon which the redirection of interrupt 262 from CPU-X 203 to CPU-2 202, and interrupt 264 from CPU-X 203 to CPU-M 204 by redirection system 300 are based can include, but are not limited to, an I/O affinity policy, a local memory policy, and/or a reduced I/O intension policy, which are explained in more detail below (e.g., policies 41, 42, 43, respectively; FIG. 3A).

Figure 1B:
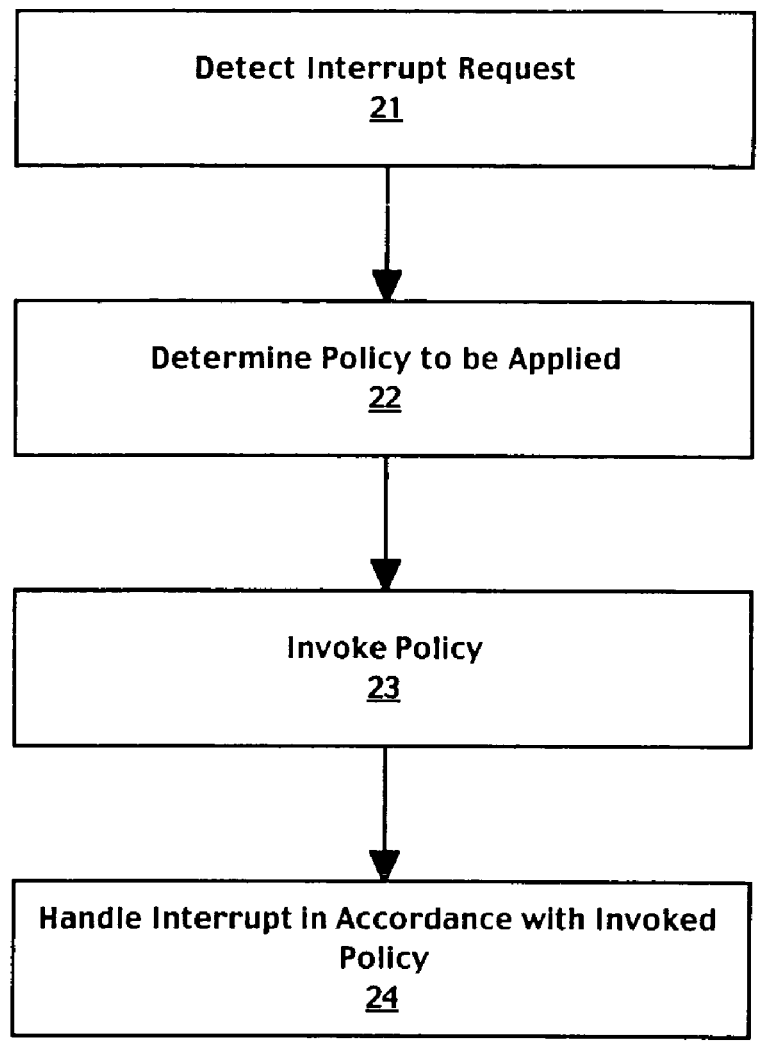
FIG. 1B is a flowchart of an exemplary computer based process for redirecting an interrupt, according to one embodiment of the present invention.

FIG. 1B is a flowchart of an exemplary computer-based process 20 for redirecting an interrupt, according to one embodiment of the present invention. Process 20 exemplifies one implementation of redirection mechanism 300 (FIG. 2A). Process 20 begins with step 21, wherein an interrupt request (e.g., IRQ 262, 264; FIG. 2A) is detected.

In step 22, the interrupt policy to be applied is determined. This policy can include, but is not limited to, an I/O affinity policy, a local memory policy, and/or a reduced I/O intension policy.

In step 23, the redirection policy to be applied is invoked. In step 24, the interrupt is handled in accordance with that policy. Process 20 can be complete upon execution of step 24.

Exemplary Interrupt Redirection System

FIG. 2 depicts an exemplary interrupt redirection system 300, according to one embodiment of the present invention. In one embodiment, interrupt redirection system 300 is deployed within a kernel 309 of operating system (OS) 310. interrupt redirection system 300 comprises an interrupt dispatching module 301 and an interrupt redirection policy module 302 associated therewith. Interrupt redirection system 300 can comprise software acting in conjunction with hardware functionality (e.g., CPU-X 203; FIG. 2A).

Interrupt dispatching module 301 comprises, in one embodiment, a mechanism by which to redirect an interrupt received by a first processor to a second processor. OS 310 suppresses handling of said interrupt by said first processor. In one embodiment, this suppression is provided by interrupt dispatching module 301, along with redirection of the interrupt to the second processor for handling.

Interrupt redirection policy module 302 comprises a mechanism for deciding to which processor to redirect an interrupt for optimum efficiency. Interrupt redirection policy module 302 can comprise a collection of several interrupt redirection policies, from which a particular policy can be selected for a particular application. In one embodiment, interrupt redirection policy module 302 thus comprises a policy selection.

FIG. 3A depicts interrupt redirection policy module 302 as an exemplary interrupt redirection policy selection module, according to one embodiment of the present invention. Interrupt redirection policy module 302 comprises a policy selector 45. Policy selector 45 selects from a collection 49 of interrupt redirection policies. In the present embodiment, collection 49 comprises an I/O affinity policy 41, a local memory policy 42, and an I/O intension reduction policy 43. However, collection 49 can comprise any number of policies by which to redirect interrupts, for instance, to optimize the efficiency of a deploying system.

The I/O affinity policy 41 redirects interrupts to a particular processor on the basis of that processor possessing cached data. The presence of this cached data can imply that the target processor for redirection on the basis of policy 41 can probably proceed upon receiving the redirected interrupt with the operation requested by that interrupt without having to fetch and cache data from a location external to the processor cache, thus reducing memory latency and concomitantly improving efficiency. The I/O affinity policy 41 is referred to herein as a "warm cache policy."

The local Memory Policy 42 redirects interrupts to a processor on the basis of that processor's location, low latency, or other proximity to a particular memory location. For instance, where the operation requested by an interrupt requires access to driver code stored in a memory area closest to one of several processors, the local memory policy 42 selects that closest processor as the target for the redirection of that interrupt. Redirection on the basis of memory location (e.g., the varying latencies of remote memory retrieval) can provide efficient operation in non-uniform memory access (NUMA) architectures. The Local memory policy 42 is referred to herein as a "NUMA locality policy."

A condition can arise in a multi-processor system where one particular processor is subjected to multiple and/or repeated interrupt requests within a short time interval, while the other processors are subjected to relatively few (or no) interrupts. This condition can saturate the processor that receives the many interrupt requests, which can cause delays in its response thereto and/or cause it to fail to respond to one or more of the interrupts. The I/O intension reduction policy 43 redirects some of the incoming interrupts from the affected processor to one or more of the unaffected processors, thus reducing the interrupt response load on the affected processor. The I/O intension reduction policy 43 is referred to herein as a "load sharing policy."

Figure 3B:
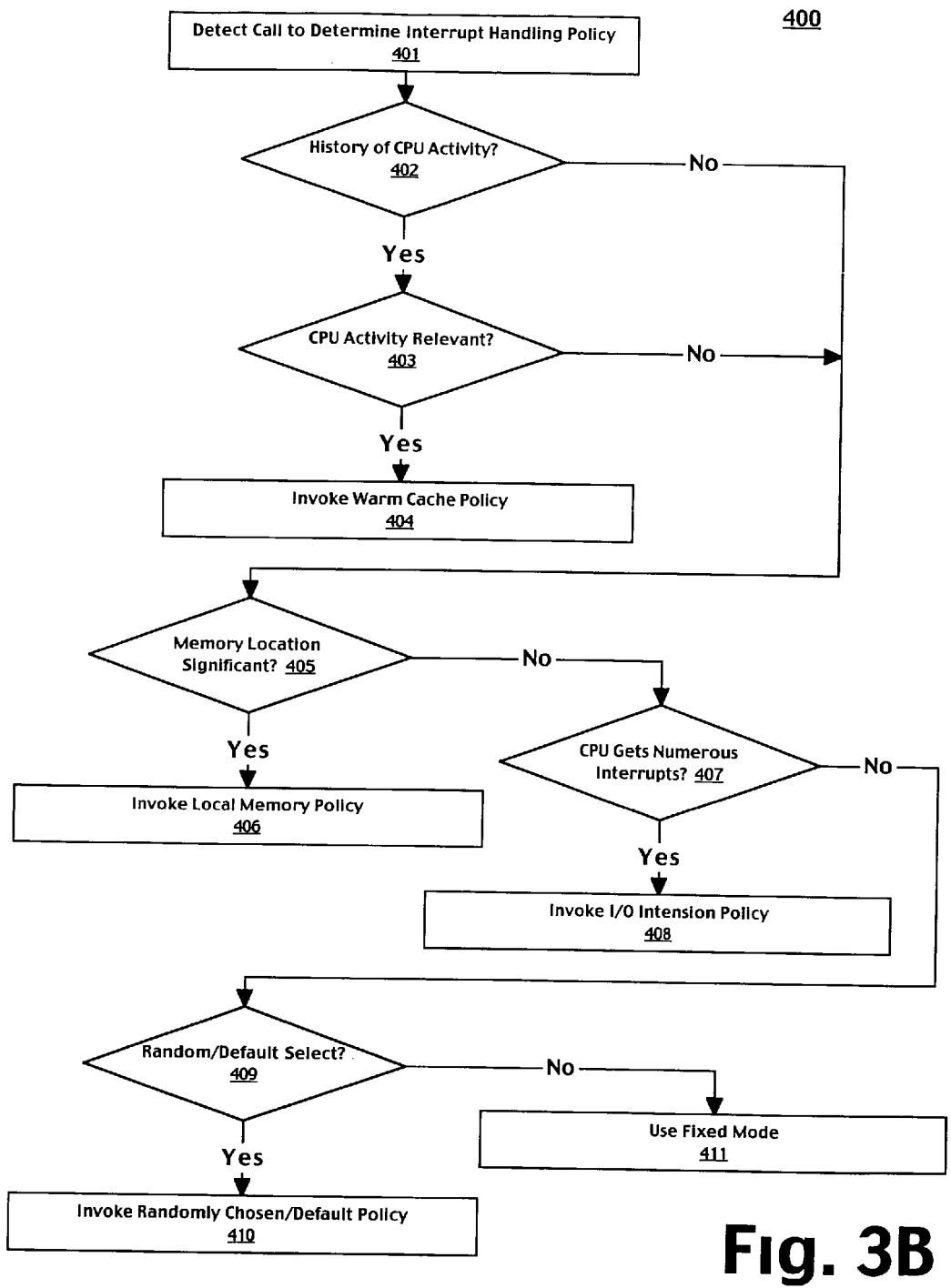
FIG. 3B is a flowchart of an exemplary computer based process for selecting an interrupt redirection policy, according to one embodiment of the present invention.

Selecting an interrupt redirection policy is a characteristic of the operation of policy selection module 302. In one embodiment, this selection process includes selecting a policy for redirecting the interrupts from among the policies 41–43 comprising policy collection 49. FIG. 3B is a flowchart of an exemplary computer-based process 400 for selecting an interrupt redirection policy, according to one embodiment of the present invention. Process 400 begins with step 401, where a call is detected to select an interrupt handling policy (e.g., a policy for redirecting the interrupt requests received), such as upon receiving a processor receiving an interrupt request.

In step 402, it is determined whether there is a stored history of activity by one of the processors of a multi-processor system. If it is determined that there is a history of activity by one of the processors, then in step 403, it is determined whether that processor activity is relevant to the interrupt request received, for instance, possibly implicative that the processor has cached some relevant data. If it is determined that that the processor activity is relevant to the interrupt request received, then in step 404, a warm cache policy (e.g., policy 41; FIG. 4A) is invoked.

If it is determined that either there is no history of processor activity or that processor history is not relevant to the interrupt request received, then in step 405, it is determined whether memory location (e.g., the temporal-based or other proximity of a particular processor to a particular memory area or locus) is significant to the interrupt request received. For instance, the operation requested by an interrupt can require access to driver code (e.g., driver code 606; FIG. 5A) stored in a memory area closest to one of several processors. In this case, this proximity can imply memory location significance. If it is determined that the memory location is significant to the interrupt request received, then in step 406, a local memory policy (e.g., policy 42; FIG. 3A) is invoked.

If it is determined that the memory location is not significant to the interrupt request received, then in step 407, it is determined whether the processor receiving an interrupt request is being subjected to multiple and/or repeated interrupt requests within a short time interval, while other processors in the multi-processor system are subjected to relatively few (or no) interrupts. If it is determined that the processor receiving the interrupt request is being subjected to multiple and/or repeated interrupt requests within the short time interval, while the other processors are not, then in step 408, a reduced I/O intension policy (e.g., policy 43; FIG. 3A) is invoked.

If it is determined that the processor receiving the interrupt request is not being subjected to multiple and/or repeated interrupt requests while the other processors are not, then in step 409, it is determined whether a default, or a policy chosen at random from a policy collection (e.g., collection 49; FIG. 4A) is to be selected. If it is determined that a default or a randomly chosen policy is to be selected, then in step 410, the default or randomly chosen policy is selected. If it is determined that a default or a randomly selected policy is not to be selected, then in step 411, the interrupt can be handled by conventional means, such as the fixed mode, wherein one of the processors is designated to handle all interrupts.

Process 400 exemplifies one interrupt redirection policy selection process. Although specific steps and sequence thereof are disclosed in FIG. 4B describing the operations of process 400, such steps and sequence are exemplary. Embodiments of the present invention are well suited to performing various other steps or variations of the steps recited, and in another sequence than the sequence depicted and described. For example, steps 405 and/or 407 can be performed prior to performing step 402, step 409 (and 410) can be optional, and/or other steps can be added to invoke other policies than the exemplary policies described above.

Exemplary Policy Implementation Mechanisms

In one embodiment, an interrupt redirection mechanism (e.g., interrupt redirection mechanism 300; FIG. 3) redirects interrupts from one processor to another according to a policy selected as described above, implementing the redirection by an implementation mechanism. The implementation operates combining software information with hardware functionality. In one embodiment, the implementation is unique to the policy selected, and comprises a feature (e.g., element) thereof. Exemplary implementations are described below.

Exemplary I/O Affinity Policy

FIG. 4A depicts an exemplary I/O affinity mechanism 500 for implementing interrupt redirection based upon a warm cache (I/O Affinity) policy, according to one embodiment of the present invention. Application 531 has been running such that processor 'A' 510 has been reading data from and/or writing data to I/O device 540, related to application 531. Processor 'A' 510 thus has at least some (possibly all) of this data cached in its associated cache 'A' 511.

Cache 'A' 511 is said to be a "warm cache" because of the presence of this data. Continuing use of processor 'A' 510 in the same or similar applications can be efficient because needed data may not have to be re-fetched from I/O device 540, or for instance, from I/O cache 541 or memory, thus reducing latency. The needed data may well already be cached in the warm cache 'A' 511, associated with processor 'A' 510.

Continuing to use of processor 'A' 510 in the same or similar applications is more efficient than using, for instance, processor 'B' 520. No data (or perhaps different data than the data needed) is cached in cache 'B' 521, associated with processor 520. Using processor 'B' 520 would thus require fetching and caching the data, adding latency. This need to fetch data that is already present in warm cache 'A' 511 makes using processor 'B' 520 less efficient than using processor 'A'.

It can be difficult to physically ascertain the actual presence of data in a cache. However, the kernel (e.g., kernel 309; FIG. 3) tracks processor usage by a kernel thread 506. Kernel thread 506 provides data to kernel-based tables, including a processor history table 503 and an interrupt history table 502.

Processor history table 503 comprises data relevant to which processor (e.g., processors 'A' 510, 'B' 520) was used last and for what application. History table 503 can also store data for some number of processor uses previous to the last. Interrupt history table 502 comprises data relevant to interrupts (e.g., interrupt 591) received by each processor and its importance, relative to another interrupt.

From the information in interrupt table 502 and history table 503, a policy table 504 is generated. Policy table 504 contains data relevant to what application (e.g., application 531) was recently involved in processing, which processor was involved in the processing, and which interrupts were recently generated.

From the data in policy table 504, the OS (e.g., OS 310; FIG. 2) can estimate which cache (e.g., cache 'A' 511, cache 'B' 522) is likely a warm cache (or e.g., a warmer cache than another, or a warmest cache). This estimate is then used by the operating system to decide which processor would be most likely to handle a subsequent interrupt most efficiently.

As shown in FIG. 4A, interrupt request 591 is received from I/O device 540 by processor 'B' 520. Cache 'B' 521 is effectively empty; it is not the warm cache. The warm cache is cache 'A' 510, associated with processor 510, which recently handled a transaction for application 531.

Warm cache policy 500 allows the OS to suppress the response of processor 'B' 520 to interrupt request 591 and instead, redirect the interrupt request as a redirected interrupt 592 to processor 'A' 510. Processor 'A' 510 then effectively handles redirected interrupt 592.

Efficiency is improved because needed data is likely cached at cache 'A' 511, such that the data does not have to be duplicatively refetched and recached at cache 'B' 521, such as would be required to allow processor 'B' 520 to handle the interrupt in the conventional fixed mode.

Figure 4B:
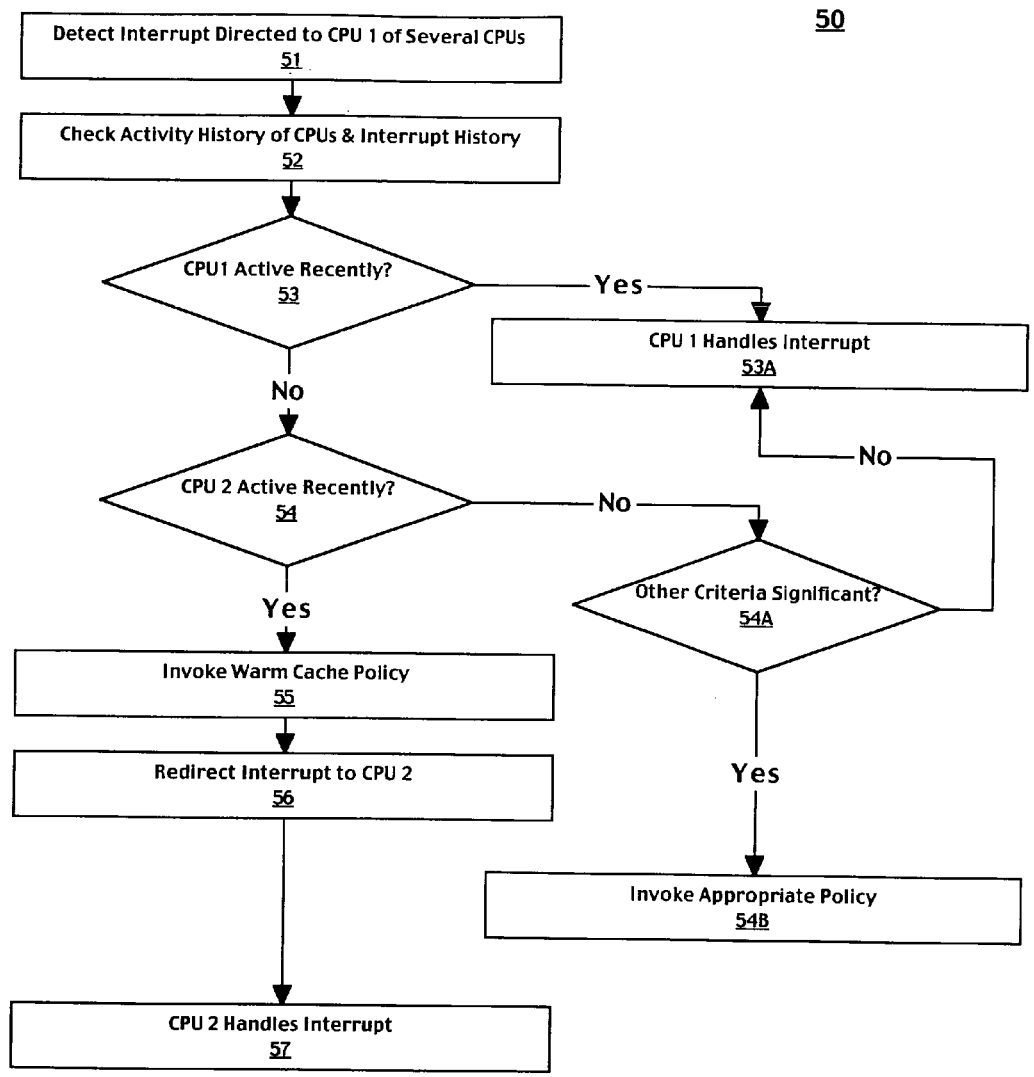
FIG. 4B is a flowchart of an exemplary computer based process for redirecting an interrupt based upon a warm cache policy, according to one embodiment of the present invention.

FIG. 4B is a flowchart of an exemplary computer-based process 50 by which warm cache policy implementation 500 efficiently handles an interrupt, according to one embodiment of the present invention. Process 50 begins with step 51, wherein an interrupt directed to a first processor of a multi-processor system is detected.

In step 52, a stored history of the activity of all processors of the multi-processor system, as well as a history of previous interrupts, is checked. In step 53, it is determined whether the first processor has engaged in any relevant recent activity. If so, then in step 53A, the first processor handles the interrupt, as directed to it.

If it is determined that the first processor has not engaged in relevant recent activity, then in step 54 it is determined whether a second processor has engaged in relevant recent activity. If it is determined that the second processor has engaged in relevant recent activity, then in step 55 the warm cache policy is invoked.

If not, then in step 54A, it is determined whether other criteria, such as NUMA locality or multiple, effectively simultaneous interrupts directed to the first processor with the second processor idle with respect to interrupts, are significant. If so, then in step 54A, an appropriate other policy can be invoked. If not, then the first processor can handle the interrupt (step 53A).

Upon invoking the warm cache policy, in step 56 the interrupt is redirected to the second processor. Upon redirection, in step 57 the interrupt is handled at the second processor.

Exemplary Local Memory Policy Implementation Mechanism

FIG. 5A depicts an exemplary local memory policy implementation mechanism 600, according to one embodiment of the present invention. In the situation depicted in FIG. 5A, the operation requested by I/O device 540 in its interrupt request 692 requires access to information such as code, data, instructions, etc., exemplified herein by "code" 606. Code 606 is stored in a memory-related area of the kernel (e.g., kernel 309; FIG. 3) that is closest (e.g., having the shortest latency associated with its retrieval) to processor 'C' 630.

In one embodiment, this need for driver code 606 and its local memory proximity to processor 'C' 630 may be shown by kernel thread 506 and the processor history, processor usage, and interrupt history data it provides to interrupt table 502 and history table 503. From the information these tables provide to policy table 504, local memory policy implementation mechanism 600 determines that interrupt request 691 would more efficiently (e.g., expeditiously) be handled by redirecting it to processor 'C' 630.

Upon determining that interrupt request 691 would be handled more efficiently by redirecting it to processor 'C' 630, due to that processor's proximity to code 606, the local memory policy implementation 600 of the OS (e.g., OS 310; FIG. 3) suppresses any response by processor 'B' 620 thereto. Local memory policy implementation 600 then redirects interrupt request 691 as redirected interrupt 692 to processor 'C' 630, which handles the redirected interrupt 692.

Figure 5B:
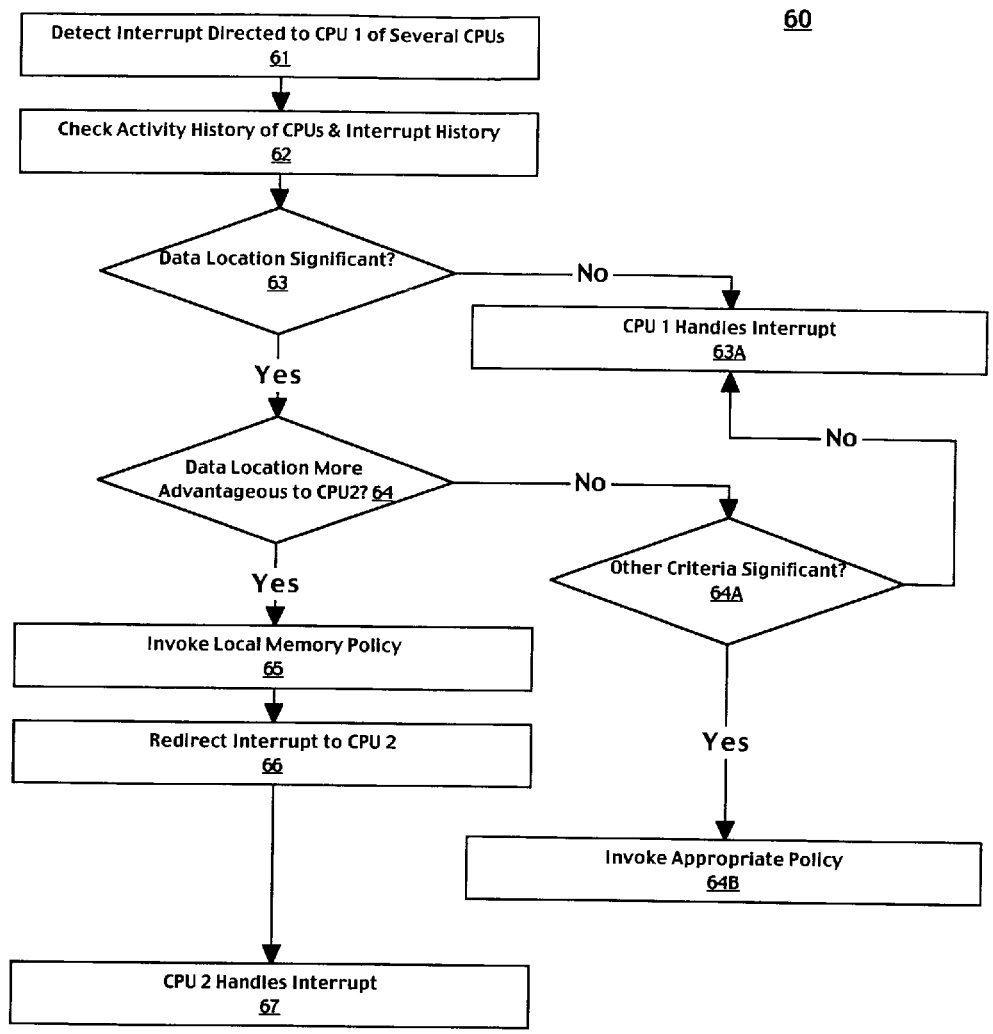
FIG. 5B is a flowchart of an exemplary computer based process for redirecting an interrupt based upon a local memory policy, according to one embodiment of the present invention.

FIG. 5B is a flowchart of an exemplary computer-based process 60 by which local memory policy implementation mechanism 600 efficiently handles an interrupt, according to one embodiment of the present invention. Process 60 begins with step 61, wherein an interrupt directed to a first processor of a multi-processor system is detected.

In step 62, a stored history of the activity of all processors of the multi-processor system, as well as a history of previous interrupts, is checked. In step 63, it is determined whether the location of data pertinent to the interrupt, such as driver code for example, is significant to efficiently handling the interrupt. If not, then in step 63A, the first processor handles the interrupt, as directed to it.

If it is determined that the location of data pertinent to the interrupt is significant, then in step 64 it is determined whether the location of the data makes it more advantageous to handle the interrupt efficiently using the second processor. If it is determined that the location of the data makes it more advantageous to handle the interrupt efficiently using the second processor, in step 65 the local memory policy is invoked.

If not, then in step 64A, it is determined whether other criteria, such as recent relevant activity by a processor or multiple, effectively simultaneous interrupts directed to the first processor with the second processor idle with respect to interrupts, are significant. If so, in step 64A, an appropriate other policy can be invoked. If not, then the first processor can handle the interrupt (step 63A).

Upon invoking the local memory policy, in step 66 the interrupt is redirected to the second processor. Upon redirection, in step 67 the interrupt is handled at the second processor.

Exemplary I/O Intension Reduction Policy Implementation Mechanism

Figure 6A:
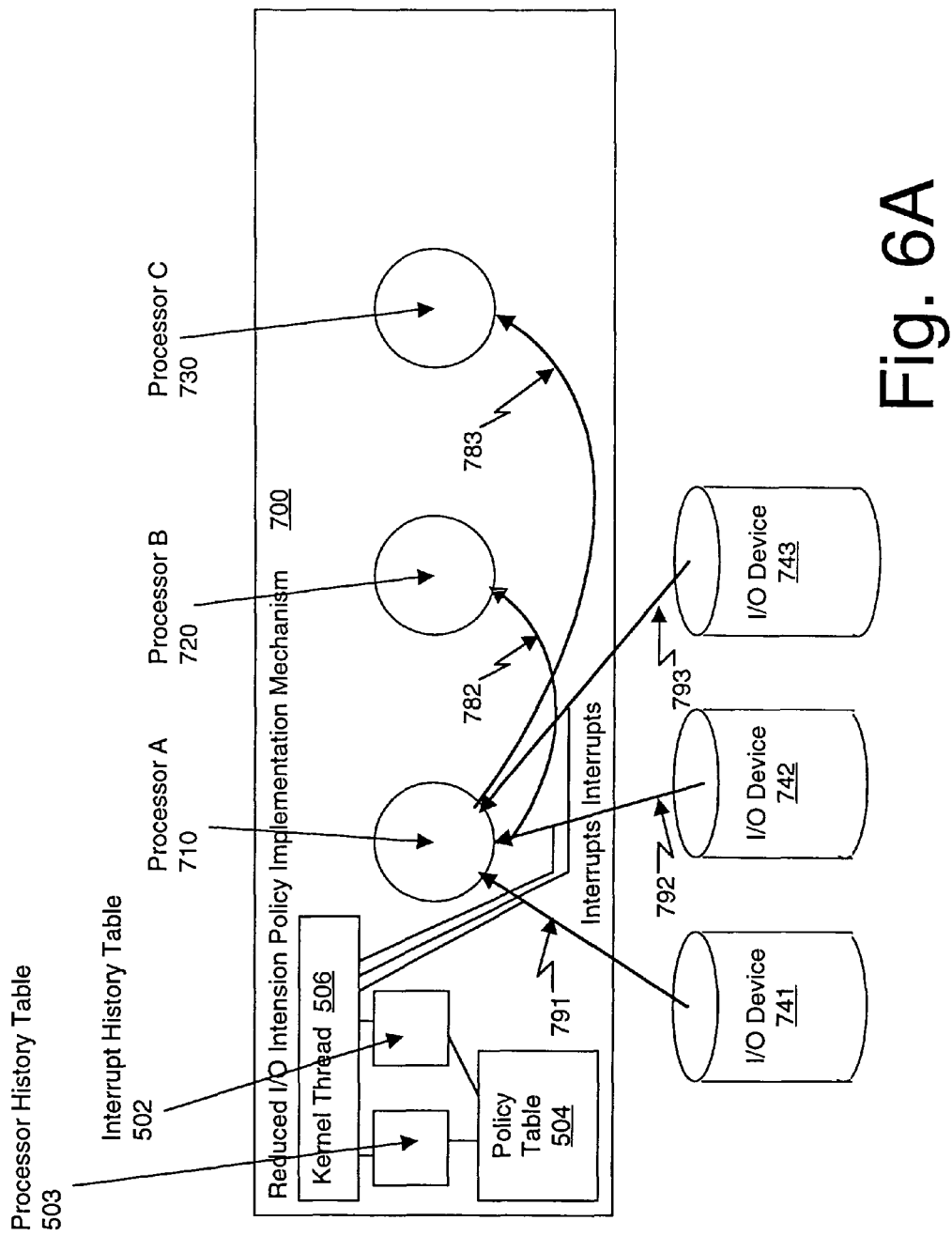
FIG. 6A depicts an exemplary system for implementing an interrupt redirection based upon an I/O intension policy, according to one embodiment of the present invention.

FIG. 6A depicts an exemplary reduced I/O intension policy interrupt redirection mechanism 700, according to one embodiment of the present invention. Within a multi-processor system, the condition can arise wherein one particular processor, here processor 'A' 710, is subjected to multiple and/or repeated interrupt requests 791, 792, and 793 from I/O devices 741, 742, and 743, respectively, within a short time interval. During this interval however, processors 'B' 720 and 'C' 730 are subjected to no interrupts.

Under such a condition, processor 'A' 710 can become saturated, without relief. Should processor 'A' 710 become so saturated, delays can arise in its response to interrupt requests 791, 792, and/or 793, and/or cause it to fail to respond to one or more of these interrupt requests. Such delays or failure to respond can adversely affect the operation of the multi-processor system.

Reduced I/O intension policy implementation 700 can provide an interrupt load sharing capability to efficiently handle the multitude of interrupts, effectively simultaneously. In one embodiment, kernel thread 506 maintains informational awareness of interrupts 791, 792, and 793, as well as any previous interrupts, and the response of processors 'A' 710, 'B' 720, and 'C' 730 thereto.

Corresponding interrupt and processor response data is logged in interrupt table 502 and processor history table 503. From this data, information is stored in policy table 504, which allows reduced I/O intension policy implementation mechanism 700 to redirect some of the incoming interrupt requests from the affected processor 'A' 710 to the unaffected processors 'B' 720 and 'C' 730, thus sharing the interrupt response load of the affected processor 'A' 710.

The OS (e.g., OS 310; FIG. 2) suppresses response by processor 'A' 710 to interrupt request 792. As shown in FIG. 6A, reduced I/O intension policy implementation 700 redirects interrupt request 792 from processor 'A' 710 as redirected interrupt 782 to processor 'B' 720. Processor 'B' 720 then handles redirected interrupt 782 as though it received interrupt request 792 directly from I/O device 742.

Further, the OS (e.g., OS 310; FIG. 2) suppresses response by processor 'A' 710 to interrupt request 793, and reduced I/O intension policy implementation 700 redirects interrupt request 793 from processor 'A' 710 as redirected interrupt 783 to processor 'C' 730. Processor 'C' 720 then handles redirected interrupt 783 as though it received interrupt request 793 directly from I/O device 743.

Figure 6B:
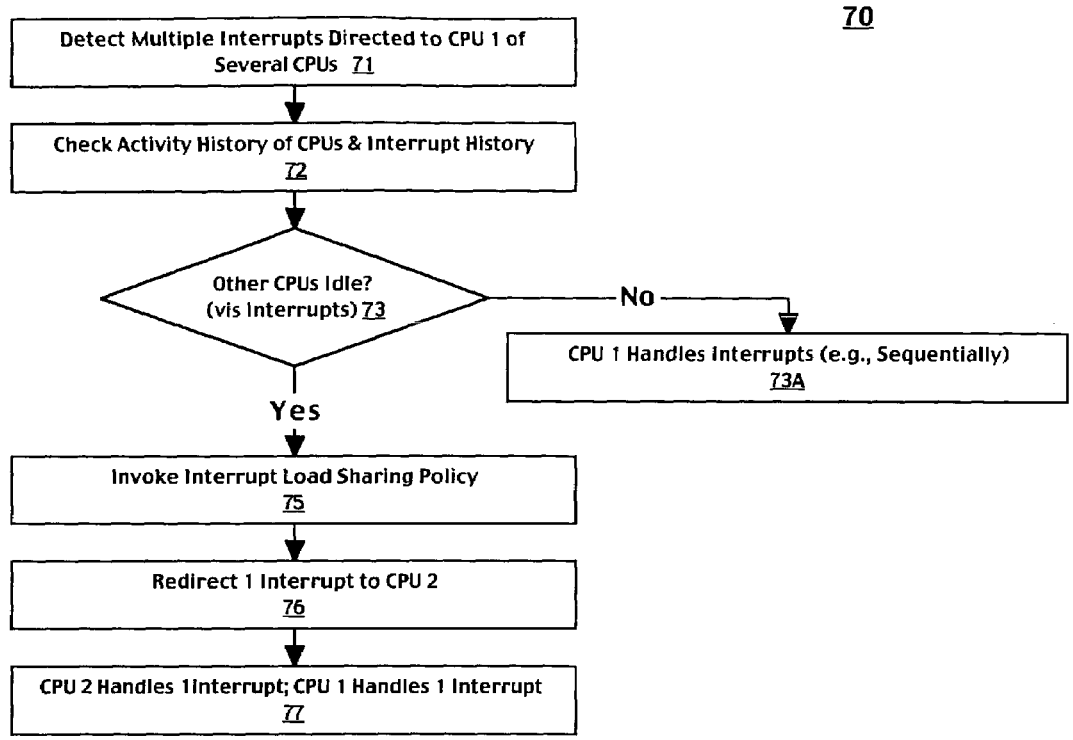
FIG. 6B is a flowchart of an exemplary computer based process for redirecting an interrupt based upon an I/O intension reduction policy, according to one embodiment of the present invention.

FIG. 6B is a flowchart of an exemplary computer-based process 70 by which I/O intension reduction policy implementation 700 efficiently handles an interrupt, according to one embodiment of the present invention. Process 70 begins with step 71, wherein it is detected that multiple interrupts are directed to a first processor of a multi-processor system, effectively simultaneously (e.g., proximate temporally).

In step 72, a history of the activity of all processors of the multi-processor system, as well as a history of previous interrupts, is checked. In step 73, it is determined whether other processors of the multi-processor system are idle, with respect to interrupts (e.g., that no interrupts are currently directed to them). If it is determined that other processors of the multi-processor system are not idle with respect to interrupts (e.g., that they are receiving or have recently received an interrupt), then in step 73A, the first processor handles the multiple interrupts, for instance, in order of relative importance and/or sequentially.

If it is determined that other processors of the multi-processor system are idle with respect to interrupts, then in step 75, an I/O intension reduction policy is invoked. Upon invoking the I/O intension reduction policy, then in step 76, one of the interrupts of the multiple interrupts received by the first processor is redirected to a second processor of the multi-processor system. Upon redirecting one of the interrupts to the second processor, in step 77 the second processor handles the redirected interrupt.

It is appreciated that another mechanism and/or process in addition to those described herein by reference to FIGS. 4A, 4B, 5A, 5B, 6A, and 6B can implement the policies (e.g., policies 41, 42, 43; FIG. 3A) described herein. Further, it is appreciated that the policies described herein are exemplary. Embodiments of the present invention are well suited to implementing a interrupt redirection system (e.g., system 300; FIG. 2) with policies other than those described herein.

In summary, for a computer system having multiple processors, one embodiment of the present invention provides a computer implemented method for handling an interrupt. Upon detecting that the interrupt is directed to one of the multiple processors, the method determines a policy for handling the interrupt in such a way as to promote efficient operation of the computer system. Upon invoking the policy, the interrupt is redirected to a second of the multiple processors according to the policy. The interrupt is then handled at the second processor. The policies include, but are not limited to, an I/O affinity policy, a local memory policy, and a reduced I/O intension policy.

Further, in such a multiple processor computer environment, a computer based system, which can be deployed in an OS kernel of the computer environment, efficiently handles an interrupt directed one of the processors. In one embodiment, the system includes an interrupt dispatching module, for redirecting the interrupt from that processor to another of the multiple processors, where the interrupt is handled. The system also includes an interrupt redirection policy module associated with the interrupt dispatching module. This policy module provides a policy to direct the interrupt redirection, which promotes efficient operation in the computer environment.

Embodiments of the present invention, a method and system for efficiently directing interrupts, are thus described. While the present invention has been described in particular embodiments, the present invention should not be construed as limited by such embodiments, but rather construed according to the following claims and their equivalents.

What is claimed is:

1. A computer implemented method for handling an interrupt comprising: detecting said interrupt as directed to a first processor of a plurality of processors of a computer system;

determining a policy for said handling wherein said handling promotes efficient operation of said computer system; invoking said policy; redirecting said interrupt to a second processor of said plurality of processors according to said policy; and handling said interrupt at said second processor;

wherein said determining comprises ascertaining that said second processor is proximate to a memory location of data pertinent to said interrupt.

2. The computer implemented method as recited in claim 1 wherein a cache memory associated with said second processor comprises a warm cache and wherein said policy comprises an input/output affinity policy.

3. The computer implemented method as recited in claim 1 wherein said policy comprises a local memory policy and wherein said computer system comprises a non-uniform memory access architecture.

4. The computer implemented method as recited in claim 1 wherein said detecting comprises ascertaining that said interrupt, as directed to said first processor, comprises a first interrupt of a plurality of interrupts directed to said first processor in temporal proximity.

5. The computer implemented method as recited in claim 4 wherein said policy comprises an input/output intension reduction policy, wherein said redirecting comprises sending said first interrupt to said second processor, and wherein said handling comprises handling said first interrupt at said second processor.

6. A computer system having a first and a second processor for handling an interrupt directed at said first processor, said system further comprising:

an interrupt dispatching module, for redirecting said interrupt from said first processor to said second processor, wherein said second processor performs said handling; and an interrupt redirection policy module associated with said interrupt dispatching module, for providing a policy to control said redirecting, wherein said handling promotes efficient operation in an environment of said computer system;

wherein said modules deployed in a kernel of an operating system.

7. The computer system as recited in claim 6 wherein said operating system suppresses said handling by said first processor.

8. The computer system as recited in claim 6 wherein said policy comprises an input/output affinity policy, wherein a cache associated with said second processor comprises a warm cache, and wherein said interrupt dispatching module redirects said interrupt to said second processor on the basis of said warm cache.

9. The computer system as recited in claim 6 wherein said policy comprises a local memory policy, wherein said second processor has a proximity to a location of code pertinent to said interrupt, and wherein said interrupt dispatching module redirects said interrupt to said second processor on the basis of said proximity.

10. The computer system as recited in claim 6 wherein said interrupt directed at said first processor comprises a first interrupt of a plurality of interrupts directed at said first processor effectively simultaneously, and wherein said second processor is idle with respect to interrupts.

11. The computer system as recited in claim 10 wherein said policy comprises an input/output intension reduction policy, wherein said interrupt dispatching module redirects said first interrupt to said second processor, and wherein said second processor handles said first interrupt.

12. The computer system as recited in claim 6 further comprising a policy table for providing historical data comprising: a previous activity of said first processor;
a previous activity of said second processor; and
a previous interrupt.

13. The computer system as recited in claim 12 wherein said historical data is provided by a kernel thread.

14. In a computer system having a plurality of processors, a computer implemented method for selecting a policy for efficiently handling an interrupt directed at a first processor of said plurality of processors, said method comprising:

ascertaining a history of activity for each of said plurality of processors and a record of a previous interrupt;
responsive to determining from said history that a second processor of said plurality of processors has cached data pertinent to said interrupt, selecting an input/output affinity policy; responsive to selecting said input/output affinity policy, redirecting said interrupt from said first processor to said second processor;
responsive to ascertaining that said second processor is advantageously proximate to code, wherein said code is pertinent to handling said interrupt, selecting a local memory policy;
responsive to selecting said local memory policy, redirecting said interrupt from said first processor to said second processor; and
responsive to redirecting said interrupt to said second processor, handling said interrupt.

15. The computer implemented method as recited in claim 14 wherein said interrupt directed at said first processor comprises a first interrupt of a plurality of interrupts directed at said first processor effectively simultaneously, said method further comprising:

determining that said second processor is idle with respect to interrupts;
responsive to determining that said second processor is idle with respect to interrupts, selecting an input/output intension reduction policy; responsive to selecting said input/output intension reduction policy, redirecting said first interrupt to said second processor; and
responsive to redirecting said first interrupt to said second processor, handling said first interrupt.

16. A system, disposed in a computer having a first processor and a second processor, for handling an interrupt directed at said first processor, said system further comprising:

an interrupt dispatching module for redirecting said interrupt from said first processor to said second processor, wherein said second processor performs said handling; and
an interrupt redirection policy module associated with said interrupt dispatching module, for providing a policy to control said redirecting, wherein said redirecting promotes efficient operation in an environment of said computer system, and wherein said interrupt redirection policy module comprises a policy table;
wherein said policy table comprises a data structure disposed in the kernel of an operating system of said computer.

17. The system as recited in claim 16 wherein said data structure comprises a first data object for providing historical data relating to a previous activity of said first processor.

18. The system as recited in claim 17 wherein said historical data relating to a previous activity of said first processor is provided by a first kernel thread.

19. The system as recited in claim 16 wherein said data structure comprises a second data object for providing historical data relating to a previous activity of said second processor.

20. The system as recited in claim 19 wherein said historical data relating to a previous activity of said second processor is provided by a second kernel thread.

21. The system as recited in claim 16 wherein said data structure comprises a third data object for providing historical data relating to a previous interrupt.

22. The system as recited in claim 21 wherein said historical data relating to a previous interrupt is provided by a third kernel thread.

23. The system as recited in claim 16 wherein said operating system suppresses said handling by said first processor apart from said redirecting.

24. The system as recited in claim 16 wherein said policy comprises an input/output affinity policy, wherein a cache associated with said second processor comprises a warm cache, and wherein said interrupt dispatching module redirects said interrupt to said second processor on the basis of said warm cache.

25. The system as recited in claim 24 wherein said policy comprises an input/output intension reduction policy, wherein said interrupt dispatching module redirects said first interrupt to said second processor, and wherein said second processor handles said first interrupt.

26. The system as recited in claim 16 wherein said policy comprises a local memory policy, wherein said second processor has a proximity to a location of code pertinent to said interrupt, and wherein said interrupt dispatching module redirects said interrupt to said second processor on the basis of said proximity.

27. The system as recited in claim 16 wherein said interrupt directed at said first processor comprises a first interrupt of a plurality of interrupts directed at said first processor effectively simultaneously, and wherein said second processor is idle with respect to interrupts.

* * * * *